Figure 1:
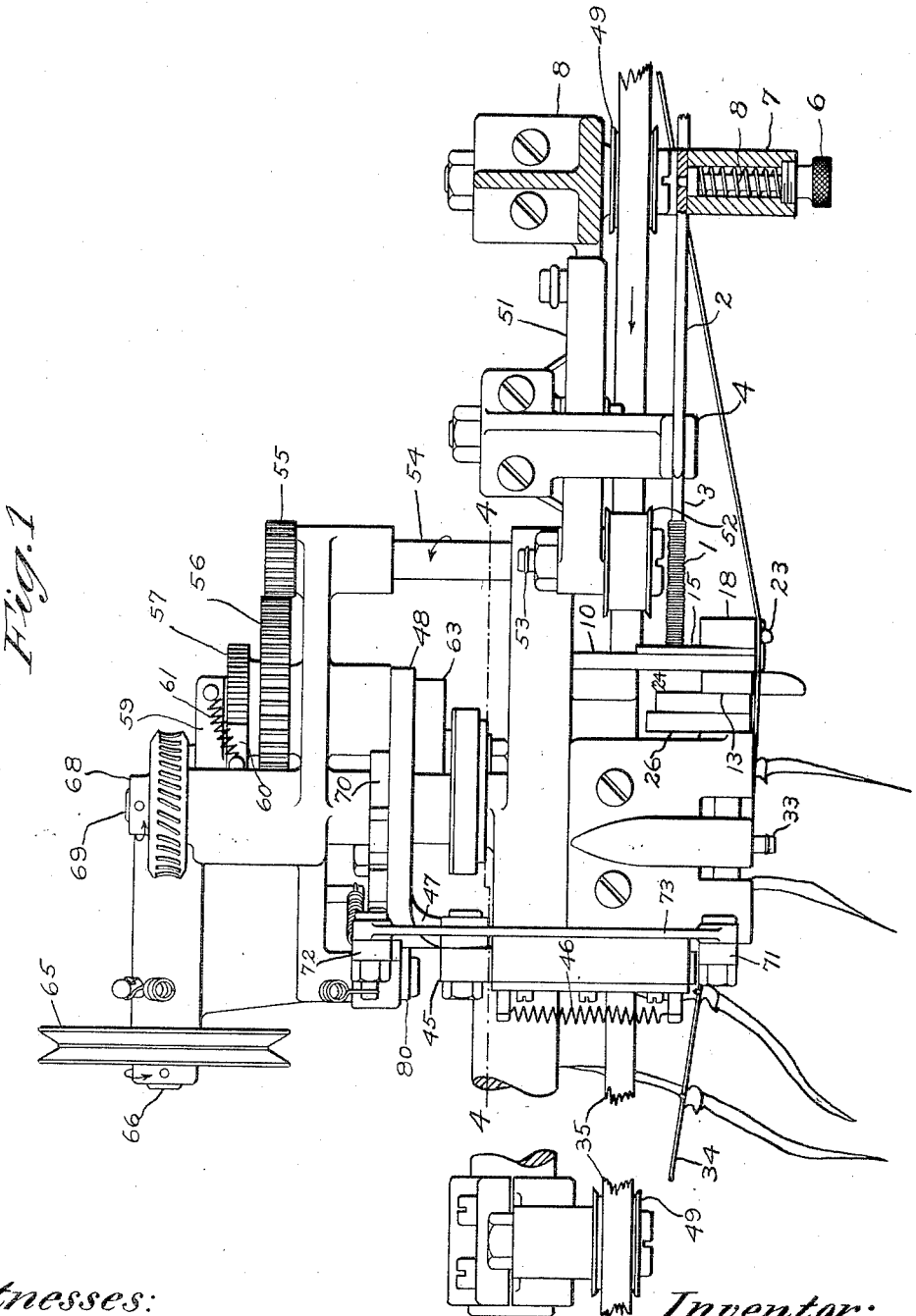

J. MERRITT.
MACHINE FOR STRINGING TOBACCO LEAVES.
APPLICATION FILED MAR. 23, 1912.

1,076,902.

Patented Oct. 28, 1913.

8 SHEETS—SHEET 3.

Witnesses:
S. S. Grotta
W. H. Linton

Inventor:
Joseph Merritt
by Harry R. Williams
Atty.

J. MERRITT.
MACHINE FOR STRINGING TOBACCO LEAVES.
APPLICATION FILED MAR. 23, 1912.

1,076,902.

Patented Oct. 28, 1913.
6 SHEETS—SHEET 6.

Witnesses:
S. S. Grotta
W. H. Linton

Inventor:
Joseph Merritt
by Harry R. Williams
Atty.

COLUMBIA PLANOGRAPH CO., WASHINGTON, D. C.

J. MERRITT.
MACHINE FOR STRINGING TOBACCO LEAVES.
APPLICATION FILED MAR. 23, 1912.

1,076,902.

Patented Oct. 28, 1913.
8 SHEETS—SHEET 7.

Witnesses:
L. L. Grotta
W. H. Linton

Inventor:
Joseph Merritt
by Nauy R. Williams
Atty.

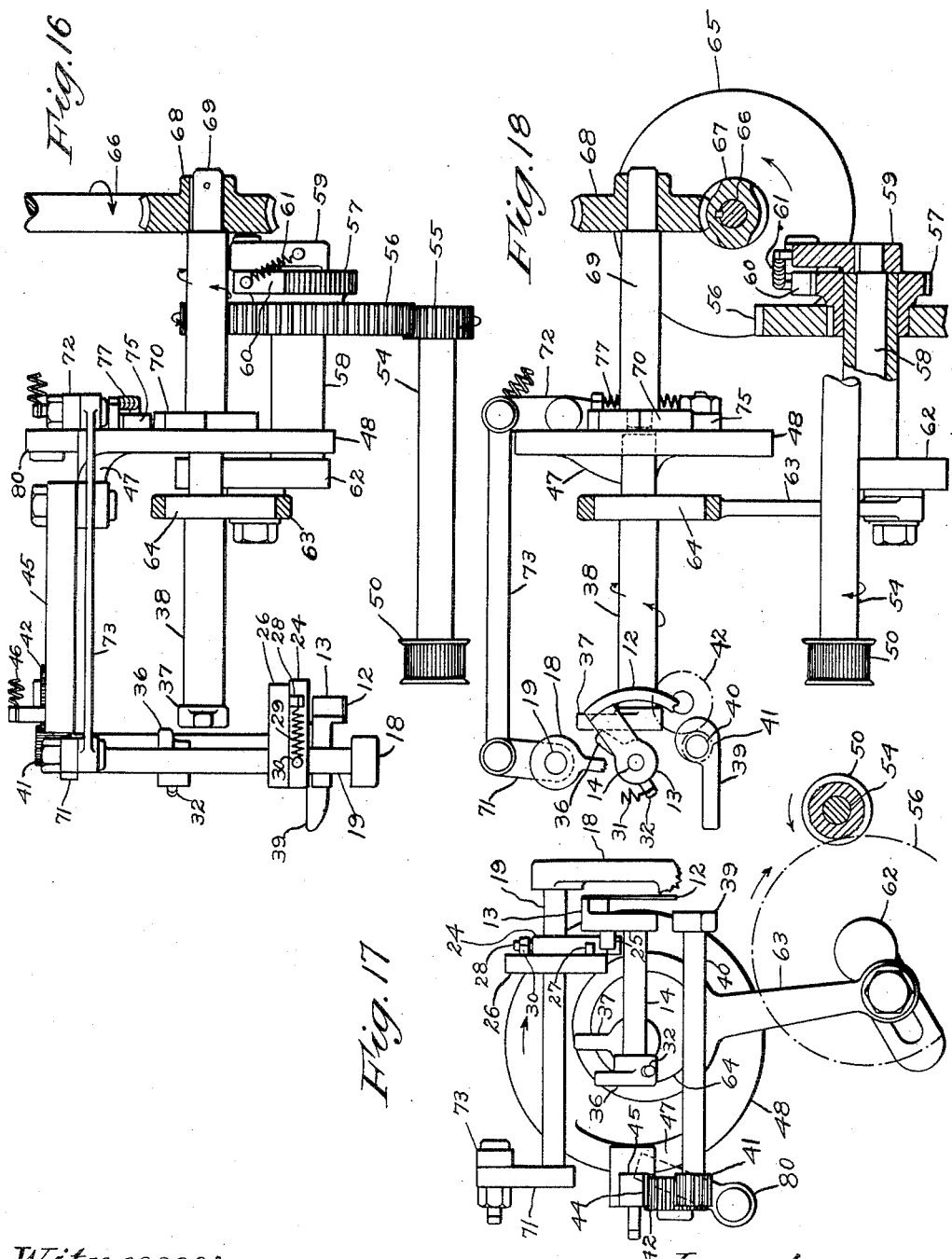

UNITED STATES PATENT OFFICE.

JOSEPH MERRITT, OF HARTFORD, CONNECTICUT, ASSIGNOR OF ONE-HALF TO ERNEST WALKER SMITH, OF HARTFORD, CONNECTICUT.

MACHINE FOR STRINGING TOBACCO-LEAVES.

1,076,902.  Specification of Letters Patent.  Patented Oct. 28, 1913.

Application filed March 23, 1912. Serial No. 685,702.

*To all whom it may concern:*

Be it known that I, JOSEPH MERRITT, a citizen of the United States, residing at Hartford, in the county of Hartford and State of Connecticut, have invented a new and useful Improvement in Machines for Stringing Tobacco-Leaves, of which the following is a specification.

It is a common practice to pick prime tobacco leaves from plants raised in the open, and also to strip leaves from shade grown plants and attach them to lath in order that they may be hung in the drying shed for curing.

This invention relates to a machine for fastening picked tobacco leaves to strings or wires attached to the supporting lath.

The object of the invention is to provide a comparatively simple and easily operated machine which is so constructed that tobacco leaves can be very rapidly fastened to the lath strings in a desirable manner.

The machine illustrated as embodying the invention is designed to be driven by power, and the mechanisms are set in operation for fastening the stems of the leaves to the string or wire by the act of putting the leaf stems into proper position, so that the leaves will be securely fastened as rapidly as an operator can pick up and present them to the machine. Each time the mechanisms are actuated a staple is driven over the string or wire into a leaf stem. The staples which are used may have their ends barbed in any desired manner, but preferably by merely turning back the tips, and they are so shaped and manipulated that when driven into the leaf stems they will spring open and the barbs be forced behind fibers of the stems that have not been cut by the act of inserting the staples. These staples may be formed to the desired shape from a coil of wire by mechanism attached to this machine, or they may be made in a separate machine and supplied from a magazine to this machine, which will drive them over a wire or a string, which may or may not be waxed and knotted, into the leaf stems as they are presented.

Figure 2:
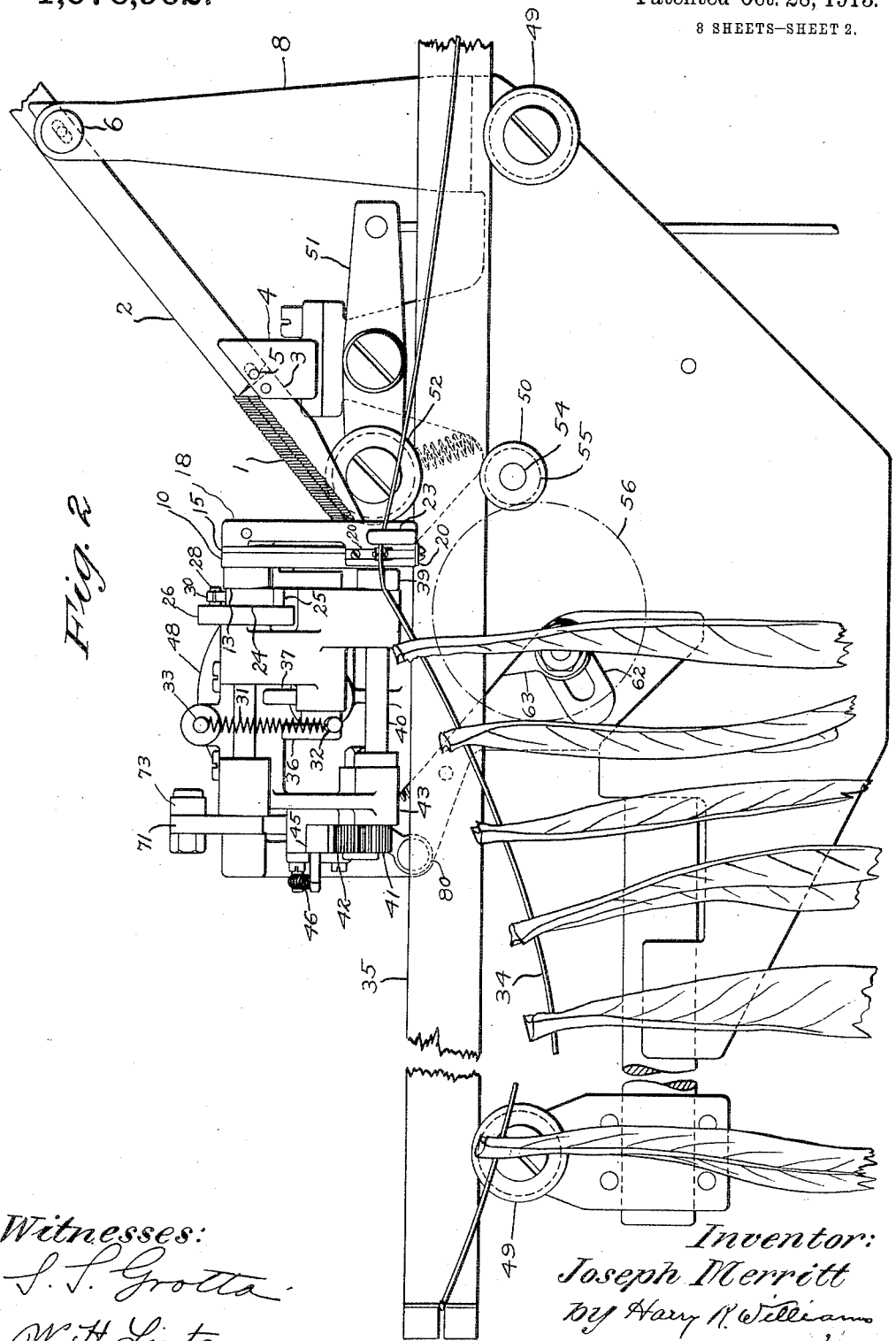
Figure 3:
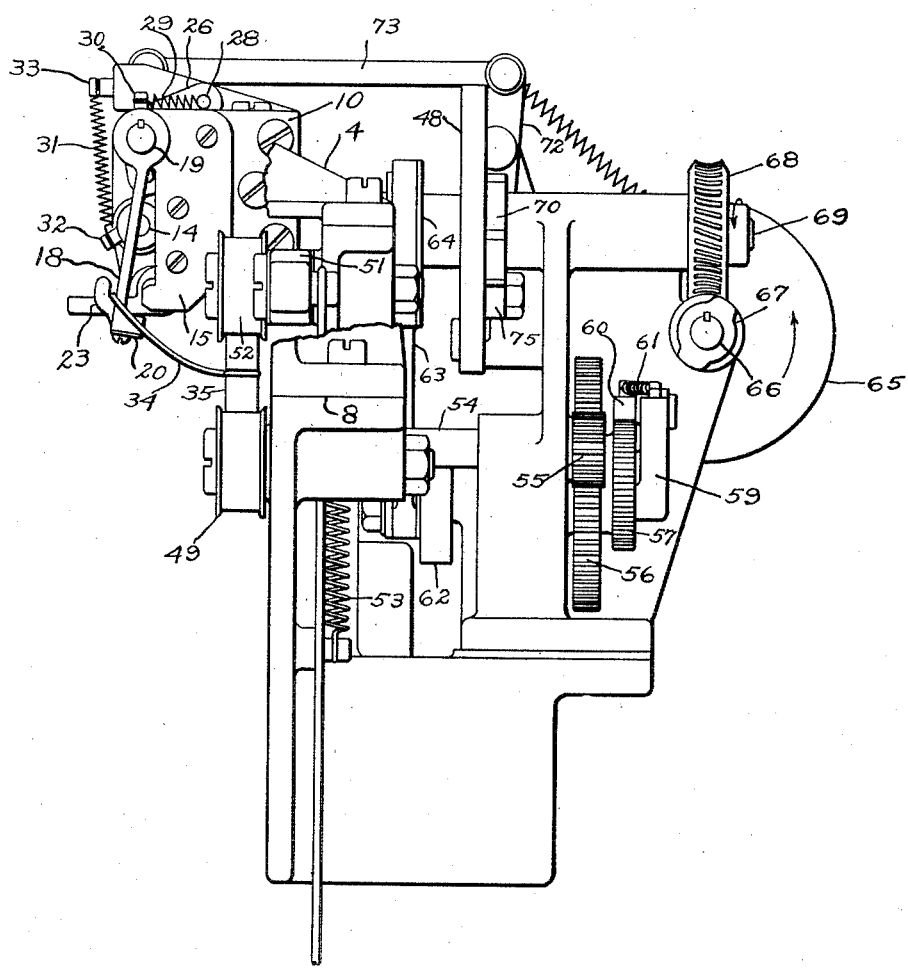
Figure 4:
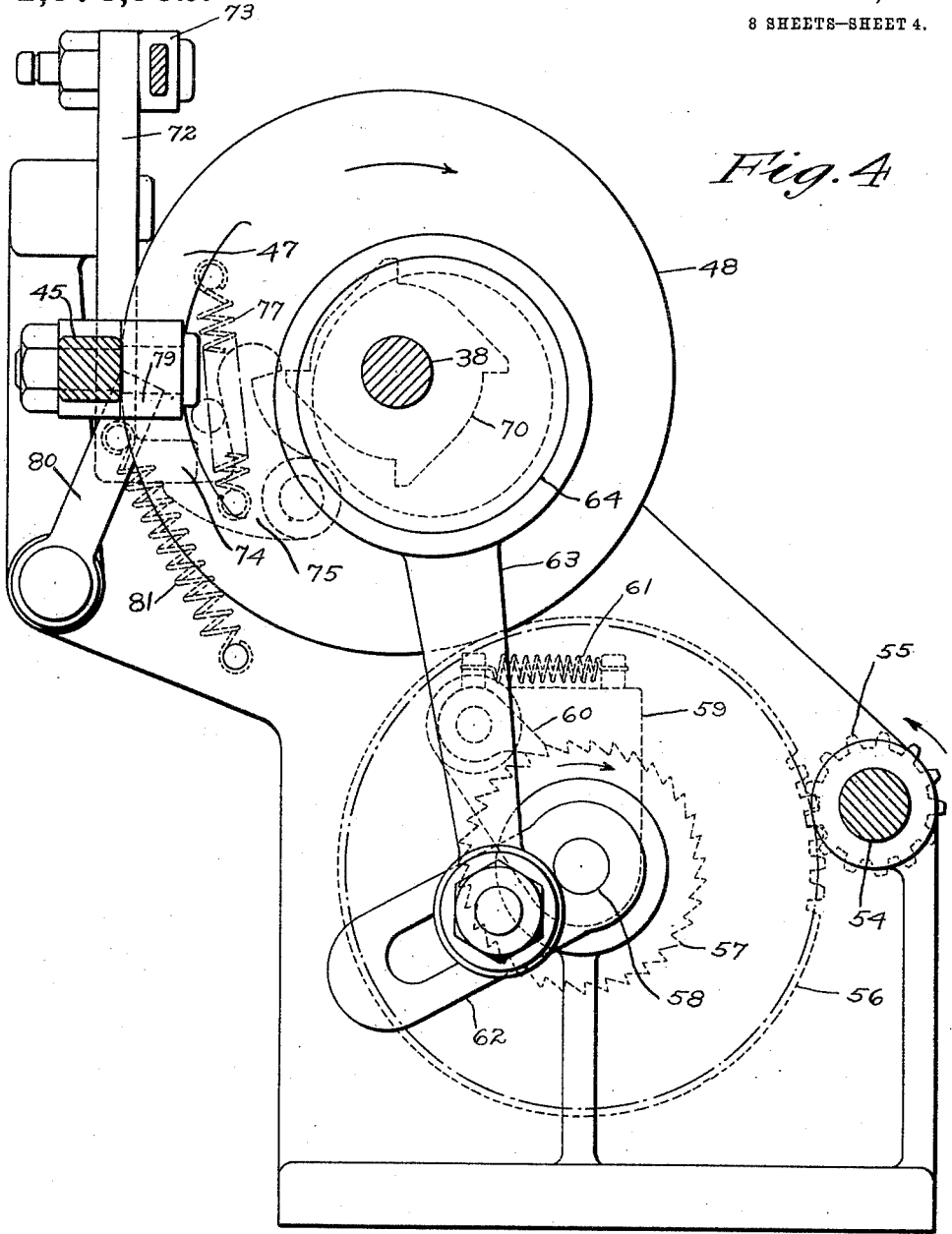
Figure 5:
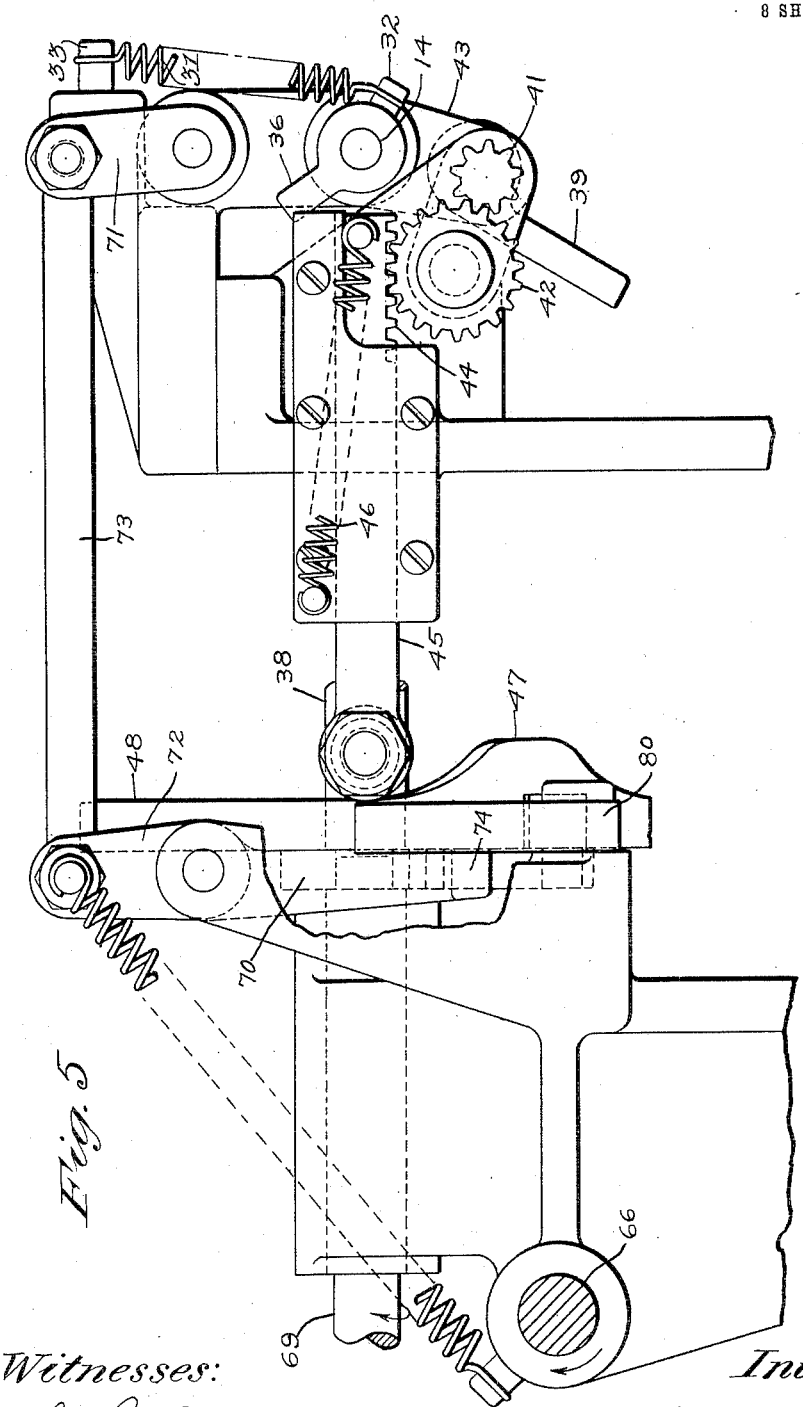
Figure 6:
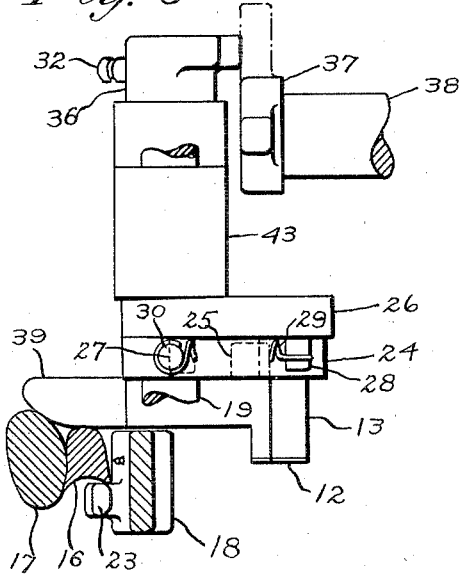
Figure 8:
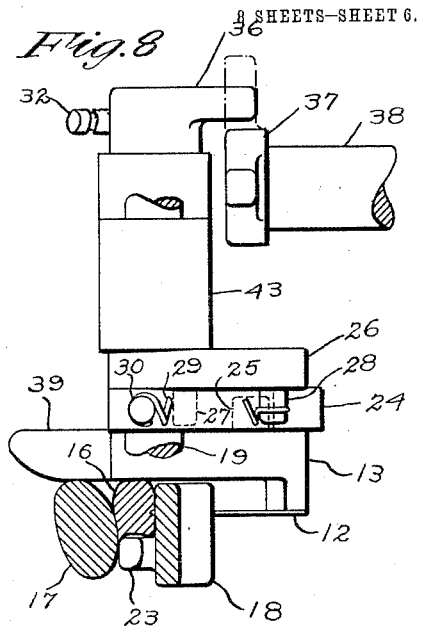
Figure 7:
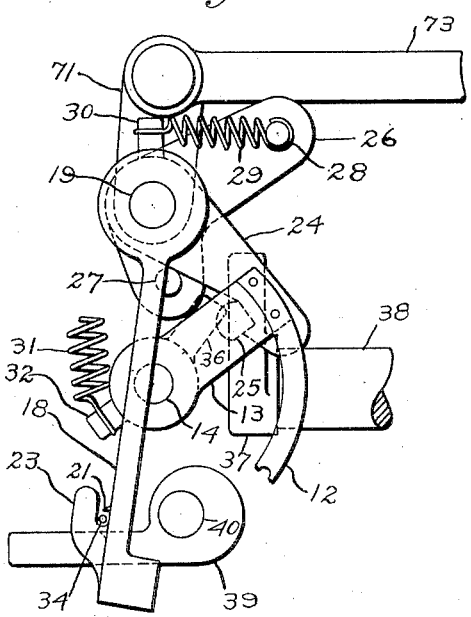
Figure 9:
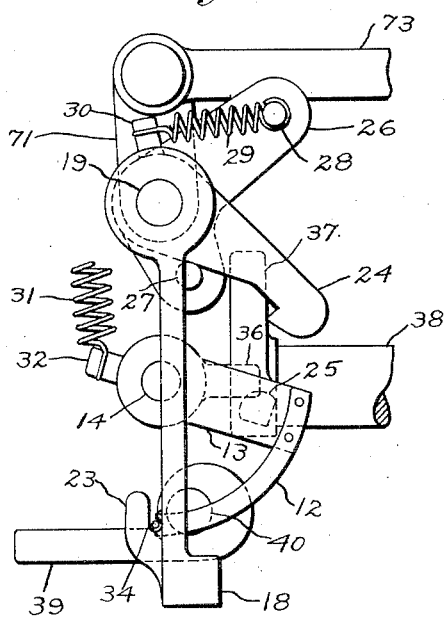
Figure 10:
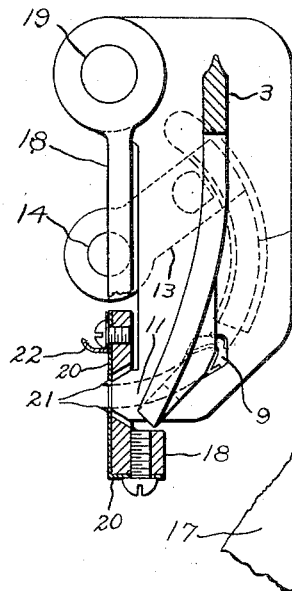
Figure 11:
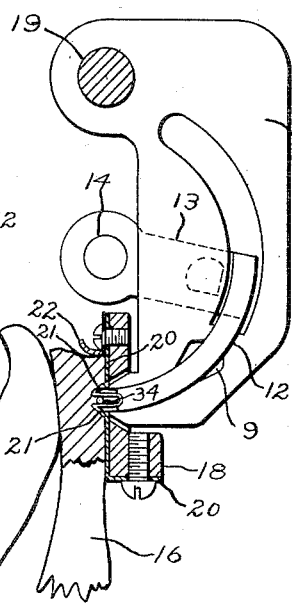
Figure 12:
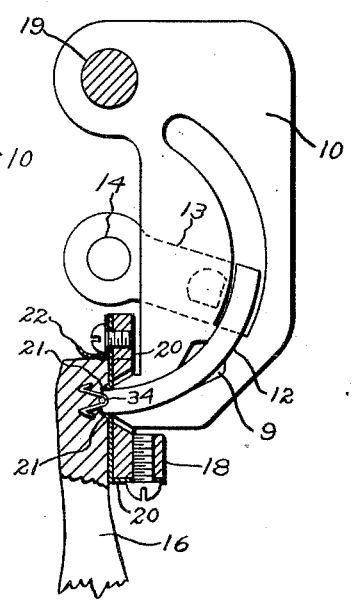
Figure 13:
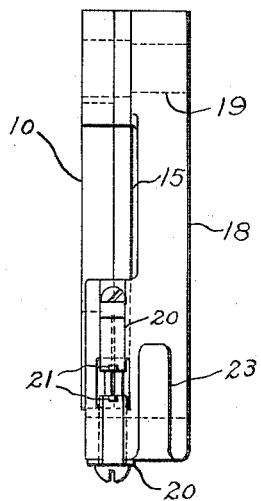
Figure 14:
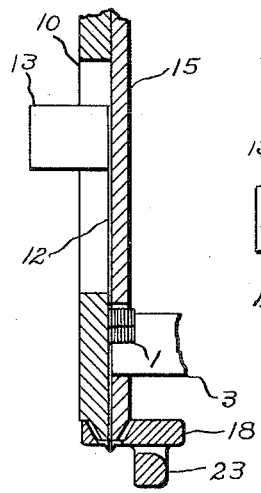
Figure 15:
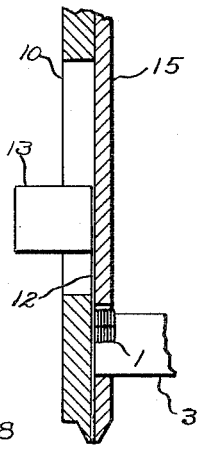

Figure 1 of the accompanying drawings shows a plan of the machine. Fig. 2 shows a front view. Fig. 3 shows an elevation looking at the right hand side of the machine with the staple feed bar and its support removed. Fig. 4 is on larger scale a vertical section taken on the plane indicated by the dotted line 4—4 on Fig. 1 and looking toward the rear. Fig. 5 is a fragmentary view in elevation, looking toward the left hand side of the machine. Fig. 6 shows a plan view of the starting mechanism ready to operate. Fig. 7 is a side elevation of the starting mechanism shown in Fig. 6. Fig. 8 is a plan of the starting mechanism set in operation. Fig. 9 is a side elevation of the starting parts in the positions occupied in Fig. 8. Fig. 10 shows a side view of the stapling mechanism with the driver in its highest position. Fig. 11 is a similar view showing the parts in the positions occupied when the staple is about to be driven into the stem of a tobacco leaf. Fig. 12 is a similar view with the parts in the positions occupied when the staple is completely driven into the leaf stem. Fig. 13 shows a front view of the starter and adjacent parts. Fig. 14 is a developed section of parts in the positions shown in Fig. 10. Fig. 15 is a similar view of the same parts in substantially the same positions as shown in Fig. 11. Fig. 16 is a skeleton plan of the operating mechanisms. Fig. 17 is a front view of the parts shown in Fig. 16. And Fig. 18 is a skeleton side view of these parts.

The staples 1 are brought to the machine illustrated, on a magazine-bar 2, down which they slide onto the inclined feed-bar 3. The slotted lower end of the magazine-bar is detachably connected with the bracket 4 by a stud 5. (Fig. 2). The upper end of the magazine-bar is retained by a pin 6 that is thrust inward by a spring 7 which is located in a pocket at the upper end of the bracket 8. (Fig. 1).

The staples slide by gravity down the feed-bar, the lower end of which is slightly turned, and one by one pass from it into the recess 9 in the face of the guide-plate 10. (Fig. 10). Movable in a curved groove 11 in this guide-plate, which is fastened to the machine frame, is an arc-shaped driver 12. The recess into which the staples drop one by one is an enlargement of a portion of this curved groove in the guide-plate, in which the curved driver travels. This driver, which is a piece of thin metal that has its driving end shaped to fit the rounded end of the staple, is fastened to the end of a rocker-arm 13 that is attached to a shaft 14. (Figs. 11, 17, 18). On the face of the guide-plate and over the groove and driver is a cover plate 15. (Figs. 10, 14). When the machine is in operation, this rocker-arm oscillates the driver in the curved groove in the guide-plate, and causes it to force the staples from the staple recess, into which they drop from the feed-bar, through the guide groove and into the tobacco stem 16 that is held in front of it by the thumb 17 of the operator. (Figs. 10, 11, 12). It will be noted from an examination of these figures that the recess into which the staple drops from the feed-bar is wider than is the guide groove below the recess, so that the staple when pushed by the driver along the groove is contracted, but that after it is driven into the stem, it expands so that the barbed ends are wider than the incision opening into the stem and cannot pull out. (Fig. 12).

The starting device or swinging trigger 18 is keyed on a rotatable shaft 19. The lower end of the trigger has mouth plates 20, the opening between which coincides with the opening in the end of the staple guiding groove when the trigger is pushed back. Above and below this mouth these plates have pointed lips 21 which press into the surface of the leaf stem, and above the mouth is a finger 22 which acts as a gage for the upper end of the stem. (Figs. 10, 11, 12, 13). The lips 21 press into the leaf stem and hold the ends of the staple contracted until after the barbs are forced into the stem below the surface. Thus the barbs spring out back of uncut fibers of the stems. (Figs. 11, 12). On the front of the starting trigger at one side of the mouth is a string guiding arm 23. (Figs. 2, 7, 13, 14). Loosely mounted on the trigger shaft is a latch 24 with a hooked end. The hook of this latch is normally engaged with a stud 25 projecting from the back of the rocking driver carrying arm. Fixed on the trigger shaft is an angle lever 26. The lower arm of this lever has a stud 27 that projects beneath the trigger. A stud 28 projecting from the upper arm of this lever is connected by a spring 29 with a stud 30 that projects from the latch. (Figs. 6, 7). A spring 31 is connected between the stud 32 that projects from the arm 36 on the driver rock shaft 14 and the stud 33 that projects from the machine frame, in such manner as to tend to swing the driver downward. (Figs. 2, 3, 5, 7). When the trigger is pushed back by the application to its front face of the stem of a tobacco leaf, it is swung from the positions shown in Figs. 6 and 7 to the positions shown in Figs. 8 and 9. This movement of the trigger turns the trigger shaft and rocks the angle lever so that the pin carried by that lever lifts the latch from engagement with the holding stud on the back of the driver carrying arm. When this arm is released the spring 31 rocks the shaft and causes the driver to swing down from the position shown in Fig. 10 to the position shown in Fig. 12 and force a staple from the recess, through the guiding groove and out of the mouth of the trigger into the leaf stem that is being pressed against the trigger. The loose string 34 which has its ends fastened to the ends of the lath 35 is held by the guiding arm 23 on the trigger across the mouth in such position that the ends of the staple straddle it when they pass from the mouth into the leaf stem, and thus the leaves are securely fastened to the string.

When the pressure against the leaf stem is removed and the trigger swings out under the influence of its spring, the angle lever is moved so that the spring which connects it with the latch causes the latch to swing down to the position shown in Fig. 7.

On the end of the shaft 14 opposite from the driver rocker arm is an arm 36. When the mechanisms are set in motion this arm is engaged by the arm 37 on the shaft 38. This lifts the arm 37 and rocks the shaft 14 so as to lift the driver and return the catch stud 25 on the driver rocker arm into engagement with the hook of the latch 24. (Figs. 6, 7, 17, 18). The string is guided in front of the staple mouth by the string guiding arm 23, and it is supported at the side of the trigger by the arm 39 that is mounted on a shaft 40. (Figs. 8, 9). On the other end of this shaft is a pinion 41 that is engaged by a gear 42. This gear, which is supported by a bracket 43 on the frame is engaged by a rack 44 on a slide 45 which is drawn back by a spring 46, and at the proper time is pushed forward by a cam 47 on a disk 48 that is mounted on the shaft 38. The cam and rack oscillate the gear and pinion so as to turn the spring supporting arm 39 down out of the path of the string and leaf after the leaf has been attached to the string. (Figs. 5, 16, 17, 18.) This string supporting arm 39 also acts as a guide for directing the stem to its proper position when it is placed against the front of the trigger. The hub of this arm 39 is cam shaped so that when the arm swings down out of the way, it will push the string forward and carry the leaf away from the front of the frame in order that these may feed freely.

The lath 35 is supported on rolls 49 arranged near opposite sides of the machine. (Figs. 1, 2, 3). Near the center of the machine is the lath feeding roll 50, above which on a lever 51 is a guiding roll 52 that is normally drawn down by a spring 53. (Fig. 2). This lever is tilted up and the guiding roll raised when the lath is put into the machine. The lath feeding roll, which desirably has its periphery roughened to insure the movements of the lath, is fixed on a shaft 54 on the other end of which is a pinion 55. Meshing with this pinion is a gear 56. This gear is fastened to a ratchet wheel 57, and both the gear and wheel are loose on the shaft 58. Fastened to the shaft 58 is an arm 59 which bears a pawl 60 that is normally held in engagement with the teeth of the ratchet wheel by a spring 61. Fixed on the end of the shaft 58 opposite from the pawl arm is a crank arm 62, adjustably connected with which is an eccentric rod 63 that is reciprocated by the eccentric 64 on the shaft 38. This eccentric and eccentric rod oscillate the crank arm, and through the pawl and ratchet wheel rotate the lath feeding roll and feed the lath a distance, depending on the adjustment of the eccentric rod with the crank arm. (Figs. 4, 16, 17, 18).

The mechanisms described operate intermittently, being actuated when the trigger is pushed back by the act of placing a leaf in position to be stapled to the string. The driving mechanism operates continuously, and is connected with the feeding and stapling mechanisms when the trigger is pushed back. The continuously running driving pulley 65 is on a shaft 66 that has a worm 67. This worm engages a worm wheel 68 on a shaft 69, fixed to which is a ratchet wheel 70. (Figs. 1, 3, 4, 16, 18). On the end of the shaft 19 opposite from the end to which the trigger is attached, an arm 71 is fastened. This arm is connected with a lever 72 by a bar 73. On the lower end of this lever is a latch lug 74 that normally engages the arm 75 of the latch hook 76, which is fastened to the cam disk 48 which is fixed on the shaft 38. (Figs. 1, 2, 3, 4, 5). This latch lug normally engages the arm and holds the latch hook away from the ratchet wheel 70 on the worm wheel shaft that is rotated continuously. (Fig. 4). When the trigger is pushed back, these connections move the latch lug 74 out of engagement with the arm 75 and allow the spring 77 to pull the latch hook into engagement with a tooth of the continuously rotating ratchet wheel 70. This connects the parts and sets the feeding and stapling mechanisms into operation. (Figs. 16, 17, 18).

A spring 78 connected between the frame and the lever 72 pulls back the lever and returns the latch lug into the path of the latch arm, and also causes the trigger to swing out when the pressure is removed from the trigger. (Figs. 1, 3, 5). The latch lug 74 is swung back into the path of the latch arm 75 so that when the disk completes its revolution, the arm will engage the lug and the latch hook will be withdrawn from the tooth of the ratchet wheel that is fixed to the worm wheel shaft. (Fig. 4). In the periphery of the cam disk 48 fixed on the shaft 38 is a notch 79. A dog 80 which is pivoted to the frame of the machine and is held by the spring 81 against the periphery of the cam disk, enters this notch and stops the parts at the proper moment so that they will be ready to operate the next time a leaf is presented to the trigger. (Figs. 4, 5).

A lath with a string attached so as to be more or less loose between the ends of the lath, is placed in the machine with the string running through the guide on the trigger and above the string support adjacent to the trigger. The driving pulley, worm wheel and ratchet wheel on the worm wheel shaft are continuously rotated. The act of placing a leaf stem in front of the trigger and pushing it back causes the release of the driver-holding-latch so that the driver will force a staple through the guide plate and out of the mouth into the leaf stem in which, as described, the staple expands so that the barbs or bent ends will project back of portions of the stem that have not been cut or broken by reason of the insertion of the staple. This backward movement of the trigger also causes the clutch-latch to engage the continuously rotated driving ratchet wheel and set into action the ratchet and pawl mechanism which feeds the lath, the mechanism which gets the string support out of the way so that the leaf and string may be fed, and the mechanisms which reset the parts for the next operation. After each revolution of the driving shaft the clutch latch is disconnected, and the feed mechanisms remain stationary with the parts set for another movement at the time the next leaf is presented to the trigger. These mechanisms are operated in this way very fast, so that leaves may be attached to the lath strings as rapidly as they can by the operator be picked up and placed against the trigger. As a result of the method of driving the staples, that is, compressing them in the guide and holding them together as they pass through the mouth and then allowing them to expand after they have been driven into the leaf stems, it is unnecessary to provide means, such as an anvil, for causing the ends of the staples to be turned over and clenched on the backs of the stems for the purpose of securely fastening them.

The invention claimed is:

1. A machine for stringing tobacco, having means for supporting a string, mechanism for intermittently feeding the string, means for driving a staple over the string into the tobacco, mechanism for operating the driver, and means for setting into operation the feeding mechanism and driver operating mechanism when the tobacco is presented to the staple driver.

2. A machine for stringing tobacco, having means for supporting a string, mechanism for intermittently feeding the string, means for driving a staple over the string into the tobacco, mechanism for operating the driver, continuously driven mechanism, and means for connecting the continuously driven mechanism with the feeding and staple driving mechanism when the tobacco is presented to the staple driver.

3. A machine for stringing tobacco, having means for supporting a string, mechanism for intermittently feeding the string, and means actuated by the presentation of the tobacco for setting into operation the feeding mechanism.

4. A machine for stringing tobacco, having means for driving a staple, mechanism for operating the driver, and means actuated by the presentation of the tobacco for setting into operation the driver operating mechanism.

5. A machine for stringing tobacco, having means for supporting a lath and string, mechanism for intermittently feeding the lath, mechanism for driving a staple over the string into the tobacco, mechanism for operating the driver, and means actuated by the presentation of the tobacco for setting into operation the lath feeding mechanism and driver operating mechanism.

6. A machine for stringing tobacco, having means for supporting a string, mechanism for intermittently feeding the string, a staple guide shaped to contract the staple as it is forced therethrough, a driver for forcing the staples through the guide and over the string into the tobacco, mechanism for operating the driver, and means for setting into operation the feeding mechanism and driver operating mechanism when the tobacco is presented to the staple driver.

7. A machine for stringing tobacco, having means for supporting a string, mechanism for intermittently feeding the string, a staple guide shaped to contract the staple as it is forced therethrough, means for driving a staple through the guide and over the string and into the tobacco, and mechanism for operating the driver.

8. A machine for stringing tobacco, having a staple guide shaped to contract a staple as it is forced therethrough, means for driving the staple through the guide and into the tobacco, and mechanism for operating the driver.

9. A machine for stringing tobacco, having a staple guide shaped to contract the staple as it is forced therethrough, and means for driving a staple through the guide and into the tobacco.

10. A machine for stringing tobacco, having normally stationary feed mechanism and staple driving mechanism, continuously running operating mechanism, and mechanism for connecting the continuously running operating mechanism with the normally stationary feed and staple driving mechanisms, said mechanism being actuated to connect said mechanisms for actuating the feed and staple driving mechanisms by the act of presenting the tobacco to the machine.

11. A machine for stringing tobacco, having means for supporting a string, mechanism for intermittently feeding the string, means for driving a staple over the string into the tobacco, mechanism for operating the driver, and a trigger adapted to be moved by the act of pressing tobacco against it for setting into operation the feeding mechanism and driver operating mechanism.

12. A machine for stringing tobacco, having means for driving a staple, mechanism for operating the driver, and a trigger adapted to be moved by the act of pressing the tobacco against it for setting into operation the driver operating mechanism.

13. A machine for stringing tobacco, having means for supporting a string, mechanism for intermittently feeding the string, a trigger adapted to be moved by the act of pressing tobacco against it for setting into operation the feeding mechanism.

14. A machine for stringing tobacco, having continuously running operating mechanism, means for supporting a lath, adjustable mechanism for feeding the lath, a trigger, and mechanism operated by a movement of the trigger for connecting the continuously running operating mechanism with the mechanism for feeding the lath.

15. A machine for stringing tobacco, having a continuously running operating mechanism, an oscillatory staple driver, a movable trigger, and mechanism actuated by a movement of the trigger for connecting the operating mechanism with the mechanism which oscillates the driver.

16. A machine for stringing tobacco, having a staple guide-plate, said guide-plate having a recess for receiving staples and a guiding groove shaped to contract the staples as they are forced therethrough, and means for forcing the staples through the guiding groove and out therefrom.

17. A machine for stringing tobacco, having means for supporting a string, mechanism for intermittently feeding the string, means for driving a staple over the string into the tobacco, mechanism for operating the driver, a movable trigger having an opening through which the staple is forced by the driver, and means actuated by a movement of the trigger for setting in operation the driving mechanism.

18. A machine for stringing tobacco, having continuously running operating means, string feeding mechanism, staple driving mechanism, and mechanism adapted to intermittently connect the continuously running operating mechanism with the feeding mechanism and driver mechanism.

19. A guide-plate for a tobacco stringing machine having a staple recess and a guiding groove leading therefrom, said groove being adapted to contract the staples as they are pushed from the recess through the groove, and means for driving the staples from the recess through said guiding groove.

20. A machine for stringing tobacco, having means for supporting a string, mechanism for feeding the string, means for driving a staple over the string into the tobacco, mechanism for operating the driver, and means for setting into operation the driver operating mechanism when the tobacco is presented to the staple driver.

21. A machine for stringing tobacco, having means for supporting a string, mechanism for feeding the string, means for driving a staple over the string into the tobacco, mechanism for operating the driver, continuously driven mechanism, and means for connecting the continuously driven mechanism with the staple driving mechanism when the tobacco is presented to the staple driver.

22. A machine for stringing tobacco, having a staple guide, means for forcing a staple through the guide, and means for holding the staple contracted until the ends are driven within the tobacco below the exterior surface.

23. A machine for stringing tobacco, having a staple guide shaped to contract a staple as it is forced therethrough, means for driving a staple through the guide and into the tobacco, and means for holding the staple contracted until the ends are driven within the tobacco below the exterior surface.

24. A machine for stringing tobacco, having means for driving a staple, mechanism for operating the driver, a trigger adapted to be moved by the act of pressing the tobacco against it, for setting into operation the driver operating mechanism, and means carried by the trigger and adapted to project into the tobacco and hold the staples contracted until the ends are driven below the exterior surface of the tobacco.

JOSEPH MERRITT.

Witnesses:
E. H. LORENZ,
W. H. LINTON.

Copies of this patent may be obtained for five cents each, by addressing the "Commissioner of Patents, Washington, D. C."